(12) United States Patent
Liu et al.

(10) Patent No.: US 10,274,593 B2
(45) Date of Patent: Apr. 30, 2019

(54) OBJECT DETECTION DEVICE AND OBJECT DETECTION METHOD

(71) Applicant: Panasonic Corporation, Osaka (JP)

(72) Inventors: Weijie Liu, Kanagawa (JP); Yoichi Nakagawa, Tokyo (JP); Makoto Yasugi, Tokyo (JP); Toshihiro Kasahara, Kanagawa (JP)

(73) Assignee: Panasonic Corporation, Osaka (JP)

( * ) Notice: Subject to any disclaimer, the term of this patent is extended or adjusted under 35 U.S.C. 154(b) by 321 days.

(21) Appl. No.: 15/265,199

(22) Filed: Sep. 14, 2016

(65) Prior Publication Data
US 2017/0097412 A1 Apr. 6, 2017

(30) Foreign Application Priority Data

Oct. 2, 2015 (JP) .................................. 2015-197017
May 19, 2016 (JP) .................................. 2016-100331

(51) Int. Cl.
| | | |
|---|---|---|
| G01S 13/58 | (2006.01) |
| G01S 13/87 | (2006.01) |
| G01S 13/52 | (2006.01) |
| G01S 7/41 | (2006.01) |
| G01S 13/93 | (2006.01) |
| G01S 13/72 | (2006.01) |

(52) U.S. Cl.
CPC .............. *G01S 13/58* (2013.01); *G01S 7/412* (2013.01); *G01S 7/415* (2013.01); *G01S 13/52* (2013.01); *G01S 13/726* (2013.01); *G01S 13/87* (2013.01); *G01S 13/931* (2013.01)

(58) Field of Classification Search
CPC ...... G01S 13/58; G01S 13/931; G01S 13/726; G01S 13/52; G01S 7/412; G01S 7/415; G01S 13/87
See application file for complete search history.

(56) References Cited

U.S. PATENT DOCUMENTS 7,567,203 B2 * 7/2009 Dizaji ..................... G01S 7/412
342/90
7,586,436 B2 * 9/2009 Wakayama ........... G01S 13/426
342/107

(Continued)

FOREIGN PATENT DOCUMENTS

WO 2012/128096 9/2012

OTHER PUBLICATIONS

Kellner et al. "Wheel extraction based on micro doppler distribution using high-resolution radar," 2015 IEEE MTT-S International Conference on Microwaves for Intelligent Mobility (ICMIM), Heidelberg, Apr. 2015, pp. 1-4.doi: 10.1109/ICMIM.2015.7117951 (Year: 2015).*

*Primary Examiner* — Matthew M Barker
(74) *Attorney, Agent, or Firm* — Seed IP Law Group LLP

(57) ABSTRACT

An object detection device includes a sub-cluster generating circuitry which, in operation, divides a cluster generated by a cluster generator into one or more first sub-clusters each corresponding to a part of an object having a different traveling direction or traveling speed from a main part of the object and a second sub-cluster corresponding to the main part of the object; and a speed calculating circuitry which, in operation, uses one or more capture points belonging to the second sub-cluster and calculates a traveling speed of the object.

11 Claims, 11 Drawing Sheets

(56) References Cited

U.S. PATENT DOCUMENTS

| | | | |
|---|---|---|---|
| 8,937,571 B2* | 1/2015 | Nagy | G01S 7/415 |
| | | | 342/27 |
| 9,599,706 B2* | 3/2017 | Zeng | G01S 13/931 |
| 9,650,026 B2* | 5/2017 | Zeng | B60T 7/22 |
| 9,689,983 B2* | 6/2017 | Cao | G01S 13/931 |
| 9,784,829 B2* | 10/2017 | Zeng | G01S 13/723 |
| 2014/0022110 A1 | 1/2014 | Itohara et al. | |
| 2014/0266860 A1* | 9/2014 | Blumrosen | A61B 8/08 |
| | | | 342/106 |
| 2016/0299222 A1* | 10/2016 | Watanabe | G01S 13/18 |

* cited by examiner

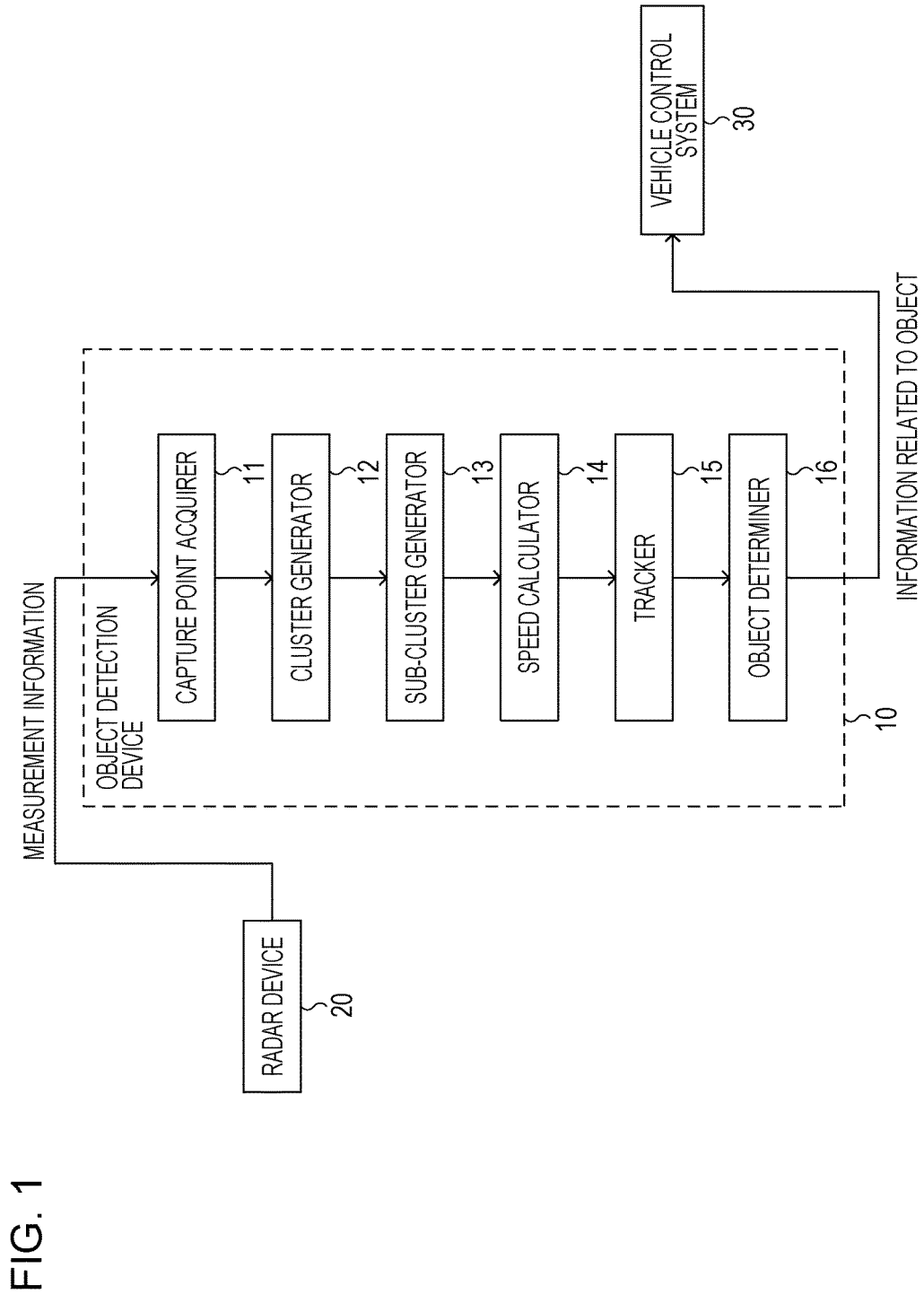

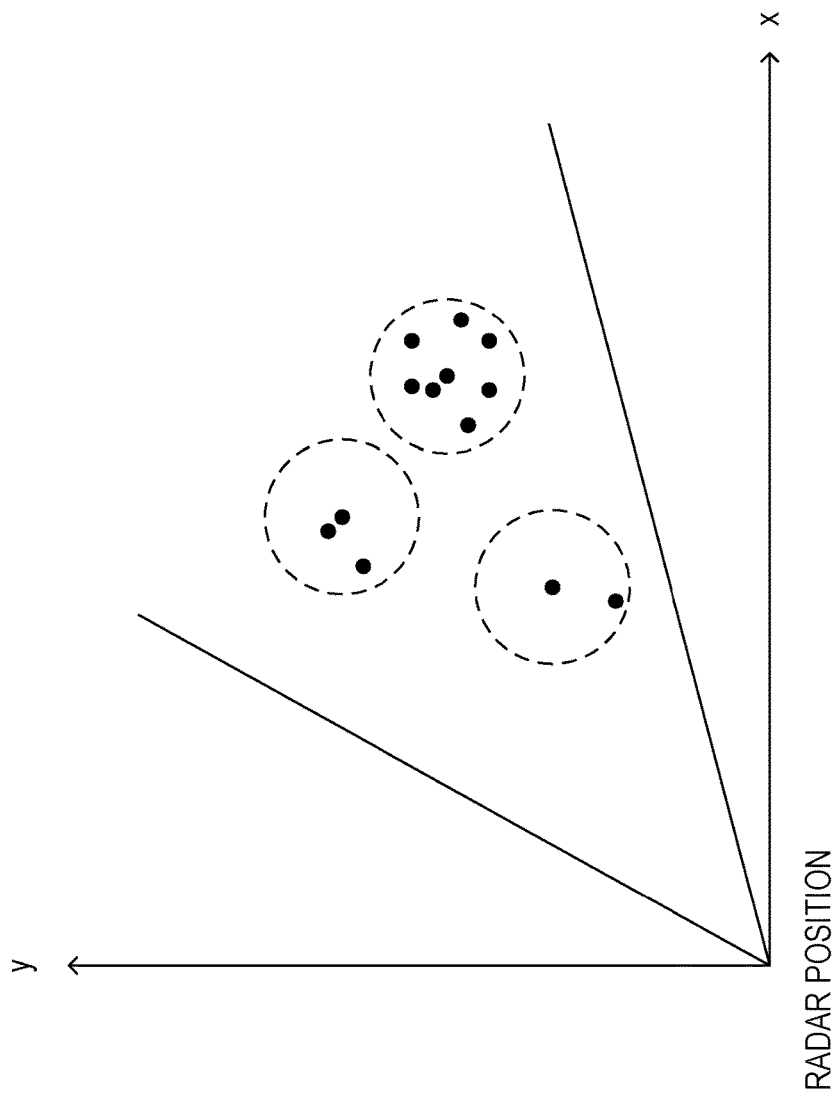

OBJECT DETECTION DEVICE AND OBJECT DETECTION METHOD

BACKGROUND

1. Technical Field

The present disclosure relates to an object detection device and an object detection method that can detect an object present around a radar device with high accuracy by using a measurement result of the radar device.

2. Description of the Related Art

Recently, a radar device is mounted on a vehicle. An onboard radar device detects an object present around the vehicle, such as another vehicle, a pedestrian, a two-wheeled vehicle, or any object installed on a road. The onboard radar device detects an object approaching from the front or side of the vehicle and measures the relative position between the vehicle and the object or the relative speed between the vehicle and the object. Then, when the onboard radar device determines based a measurement result that there is a possibility of collision of the vehicle and the object, the onboard radar device gives the driver a warning or controls the running of the vehicle to avoid the collision.

In addition, a system has been developed that monitors or manages road traffic by using radar devices installed around the road. Using a radar device installed around a crossing, for example, such a system adaptively controls a traffic light by detecting a vehicle or a pedestrian passing through the crossing or measuring a traffic flow rate. In addition, if such a system determines that there is a possibility of a collision of a vehicle and a pedestrian within a road, the system gives the driver or the pedestrian a warning to avoid the collision.

In addition, a radar device is installed to monitor, for example, an airport or other facilities. Such a radar device prevents intrusion of an object by sensing the object in the air or on the ground and providing an associated security system with information.

Thus, radar devices are utilized in various scenes to detect an object. Recently, higher resolution enables the radar device to acquire measurement data of a plurality of regions from the same object.

An example of such a radar device is disclosed in International Publication No. WO 2012/128096, which discloses a technique of clustering a group of radar measurement data from a plurality of objects so that a plurality of pieces of measurement data belonging to the same object are included in one cluster area, and detecting and tracking the object. Note that clustering is processing to group signals detected in a certain observation cycle and defining each group (cluster) as a set of signals reflected at each one object.

SUMMARY

However, the technique disclosed in International Publication No. WO 2012/128096 determines a speed of an object using all measurement data included in a cluster area. Consequently, when a part of an object moves independent of a main part of the object, movement (traveling direction or traveling speed) of the part of the object differs from movement of the main part of the object, which makes it difficult to calculate an accurate speed of the main part of the object. For example, when an object is a vehicle, rotation of wheels, which are a part of the vehicle is independent of movement of a vehicle body, which is the main part of the vehicle, and a revolving speed of the wheels is faster than a traveling speed of the vehicle body. Thus, if measurement data obtained from the wheels is used to determine a vehicle speed, calculation accuracy degrades. Similarly, when an object is a pedestrian, a speed of the pedestrian's shaking his/her hand or foot, which is a part of the pedestrian, differs from a traveling speed of his/her trunk, which is a main part of the pedestrian. Thus, if measurement data obtained from the hand or foot is used to calculate a traveling speed of the main part of the pedestrian, it is difficult to accurately calculate the traveling speed of the main part of the pedestrian.

One non-limiting and exemplary embodiment provides an object detection device and an object detection method that consider a part of an object having a different traveling direction or traveling speed from that of a main part of the object, thereby being able to accurately determine the traveling speed of the object, when clustering radar measurement data.

In one general aspect, the techniques disclosed here feature an object detection device including: capture point acquiring circuitry which, in operation, acquires, as two or more capture points, two or more unit areas that have captured an object from a plurality of unit areas into which measurement range of one or more radar devices is divided for a distance and azimuth based on measurement information including at least one of an electric power profile and a Doppler speed profile generated by the one or more radar devices using reflected wave from the object; cluster generating circuitry which, in operation, generates a cluster including the two or more capture points; sub-cluster generating circuitry which, in operation, divides the cluster into one or more first sub-clusters each corresponding to a part of the object having a different traveling direction or traveling speed than a traveling direction or a traveling speed of a main part of the object and a second sub-cluster corresponding to the main part of the object; and speed calculating circuitry which, in operation, calculates a traveling speed of the object based on one or more capture points belonging to the second sub-cluster.

According to the present disclosure, a traveling speed of an object can be accurately determined by considering a part of an object having a different traveling direction or traveling speed from a main part of the object, when clustering radar measurement data.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a diagram illustrating a main configuration of an object detection device according to a first embodiment of the present disclosure and a connection relation of a radar device and a vehicle control system;

FIG. 3 is a diagram illustrating an example of a method of determining a cluster range;

DETAILED DESCRIPTION

Figure 2A:
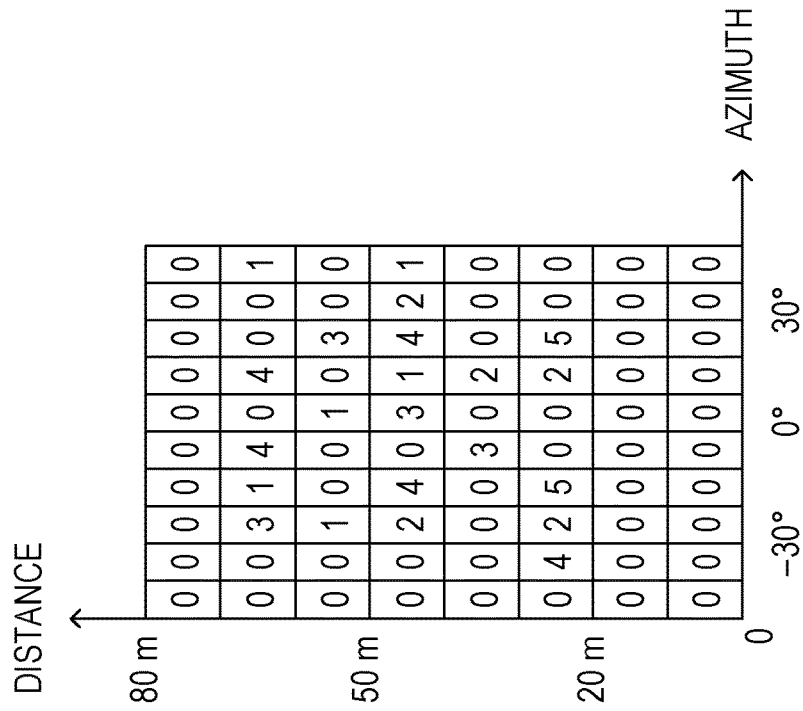
FIG. 2A is a diagram illustrating an electric power profile as an example of measurement information.

Embodiments of the present disclosure are described in detail hereinafter with reference to the drawings.

First Embodiment

An object detection device 10 according to a first embodiment of the present disclosure is described with reference to the drawings. FIG. 1 is a block diagram illustrating a main configuration of the object detection device 10 according to a first embodiment, and a connection relation of a radar device 20 and a vehicle control system 30. As illustrated in FIG. 1, the object detection device 10 according to the first embodiment is connected to the radar device 20 and the vehicle control system 30. The object detection device 10 implements a part of a radar signal processing function to process measurement information outputted from the radar device 20 and outputs various types of information obtained through the radar signal processing to the vehicle control system 30.

The radar device 20 is mounted in a vehicle, for example. The radar device 20 sequentially changes a transmission direction at a predetermined angle interval, for example, and transmits a radar signal to a measurement range. The radar device 20 receives a reflection signal which is a radar signal reflected by an object such as an obstacle or the like. In addition, the radar device 20 converts the reflection signal into a baseband signal to acquire a delay profile (propagation delay characteristic) of each transmission direction of the radar signal for each of a plurality of unit areas resulting from division of the measurement range. The radar device 20 outputs an acquired measurement result (measurement information) to the object detection device 10.

The vehicle control system 30 acquires information such as a position or a speed or the like of an object that the object detection device 10 detects by processing the radar signal outputted from the radar device 20. When the vehicle control system 30 determines that there is a possibility of collision of the vehicle and the object, the vehicle control system 30 gives a driver of the vehicle a warning or performs a process to control behavior of the vehicle (accelerator operation, brake operation, or steering wheel operation).

The object detection device 10 detects an object that is present around the vehicle, based on the measurement information outputted from the radar device 20. When detecting the object, the object detection device 10 generates information related to a position or a speed of the object and outputs the information to the vehicle control system 30. In the following, a detailed configuration of the object detection device 10, operation of each configuration, or the like are described in detail.

As illustrated in FIG. 1, the object detection device 10 has a capture point acquirer 11, a cluster generator 12, a sub-cluster generator 13, a speed calculator 14, a tracker 15, and an object determiner 16. Each configuration of the object detection device 10 may be implemented by software or hardware such as an LSI circuit, or may be implemented as a part of an electronic control unit (ECU) that controls a vehicle.

The capture point acquirer 11 acquires measurement information from the radar device 20, and, based on the measurement information, extracts a candidate for a unit area corresponding to an object captured from each of a plurality of unit areas resulting from division of a measurement range. The measurement information includes at least one of an electric power profile and a Doppler speed profile.

Figure 2B:
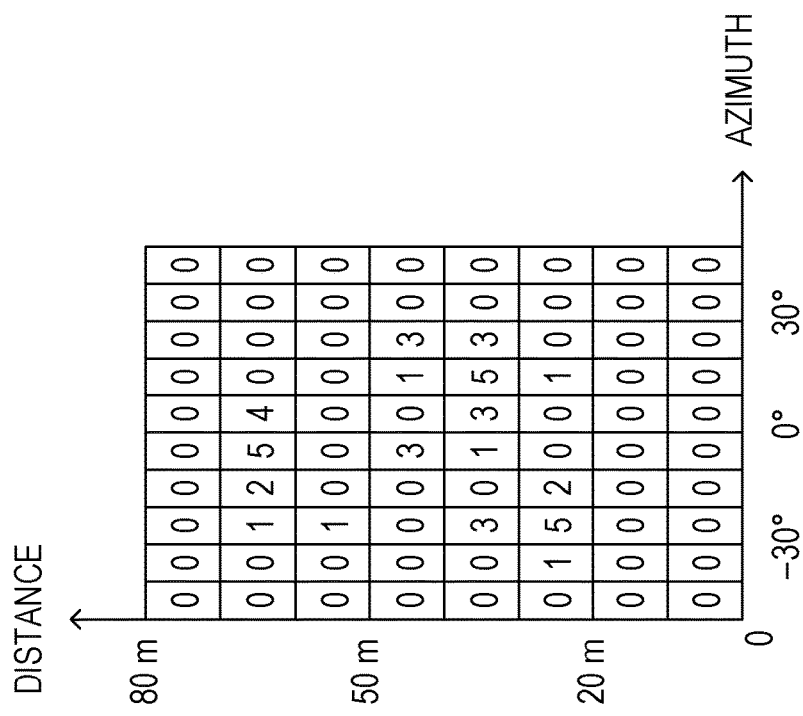
FIG. 2B is a diagram illustrating Doppler speed profile as an example of measurement information.

FIG. 2A is a conceptual diagram illustrating an electric profile as an example of measurement information. FIG. 2B is a conceptual diagram illustrating a Doppler speed profile as an example of measurement information. In FIG. 2A and FIG. 2B, a horizontal axis represents azimuth relative to the radar device 20 and a vertical axis represents a distance to an object relative to the radar device 20. In FIG. 2A and FIG. 2B, a unit area is configured by separating the horizontal axis (azimuth) by 10 degrees and the vertical axis (distance) by 10 m. In the following, the unit area is referred to as a cell.

Note that in the present disclosure, a range of azimuth and a range of distance of a cell (unit area) are not limited to the above ranges. In order to achieve a high resolution, it is preferable that the size of a cell is smaller.

In FIG. 2A, reflection intensity in each cell is indicated by 6 stages from level 0 to 5, and the level 5 is the highest reflection intensity. In FIG. 2B, a Doppler speed in each cell is indicated by 6 stages from level 0 to 5, and the level 5 is the fastest Doppler speed. Note that the Doppler speed has different symbols depending on whether an object is approaching the radar device 20 or moving away from the radar device 20. However, for simplicity of illustration, FIG. 2B illustrates the Doppler speed of positive polarity, by way of example.

A capture point acquirer 11 acquires from the radar device 20 measurement information, more specifically, an electric power profile illustrated in FIG. 2A and a Doppler speed profile illustrated in FIG. 2B. Then, the capture point acquirer 11 extracts from a plurality of cells a cell having values of a reflection intensity and a Doppler speed being greater than a predetermined threshold, and makes the extracted cell a candidate for a cell where an object may be present. The cell candidate that is extracted by the capture point acquirer 11 and where an object is present is hereinafter referred to as a capture point.

In addition, in each profile illustrated in FIG. 2A and FIG. 2B, for simplicity of illustration, the azimuth and the distance are shown illustratively in an orthogonal coordinate system having azimuth and a distance as coordinate axes. Thus, shape of each cell is rectangular. In this embodiment, however, it is preferable that the capture point acquirer 11 uses a measurement result of a polar coordinate system centering on a position of the radar device 20. In this case, shape of the cell is like a fan. Note that in the following description, irrespective of shape of a cell, each cell in the electric power profile and the Doppler speed profile illustrated in FIG. 2A and FIG. 2B is treated as a point.

The cluster generator 12 clusters a plurality of capture points extracted by the capture point acquirer 11. A method of clustering or the cluster shape are not limited in the present disclosure, and a publicly known method may be utilized. FIG. 3 is a diagram illustrating an example of a method of determining a cluster range. For simplicity of illustration, in FIG. 3, a height direction (z-axis) is omitted and a two-dimensional coordinate system (x-axis, y-axis) corresponding to the ground is illustrated. As illustrated in FIG. 3, the cluster generator 12 makes cluster shape a circle having a certain radius. The cluster generator 12 determines a capture point (local maximum point) having maximal reflection intensity in the electric power profile from acquired capture points, and determines a cluster range with the local maximum point as a center point. Then, the cluster generator 12 may define all capture points included in the cluster range as one cluster. Note that the cluster generator 12 can change a circle of a certain radius set as cluster shape, depending on a detection target. When a detection target is a large-size vehicle, for example, the cluster generator 12 sets a radius to approximately 5 m, and can set the radius to 3 m for a medium-size vehicle. In addition, a cluster may be generated for an object, or when a plurality of clusters are generated for one object, subsequent processing may be performed after integrating the plurality of clusters into one cluster.

The sub-cluster generator 13 uses a restriction relation between an azimuth measurement value and a Doppler speed value relative to capture points belonging to each of the clusters generated by the cluster generator 12 and divides each cluster into two types of sub-clusters. The two types of sub-clusters are a sub-cluster (second sub-cluster) corresponding to a main part of an object (main body of an object) and one or more sub-cluster (first sub-cluster) corresponding to a part of the object having a different traveling direction or traveling speed from the main part of the object. For example, when an object is a vehicle, the second sub-cluster corresponds to a main part (main body or the like) of the vehicle and the one or more first cluster corresponds to wheels. Alternatively, when an object is a person (pedestrian), the second sub-cluster corresponds to a main part (trunk part) of a person and the one or more first sub-clusters each correspond to a hand or foot, or the like. Processing of the sub-cluster generator 13 is described in detail hereinafter.

Figure 4:
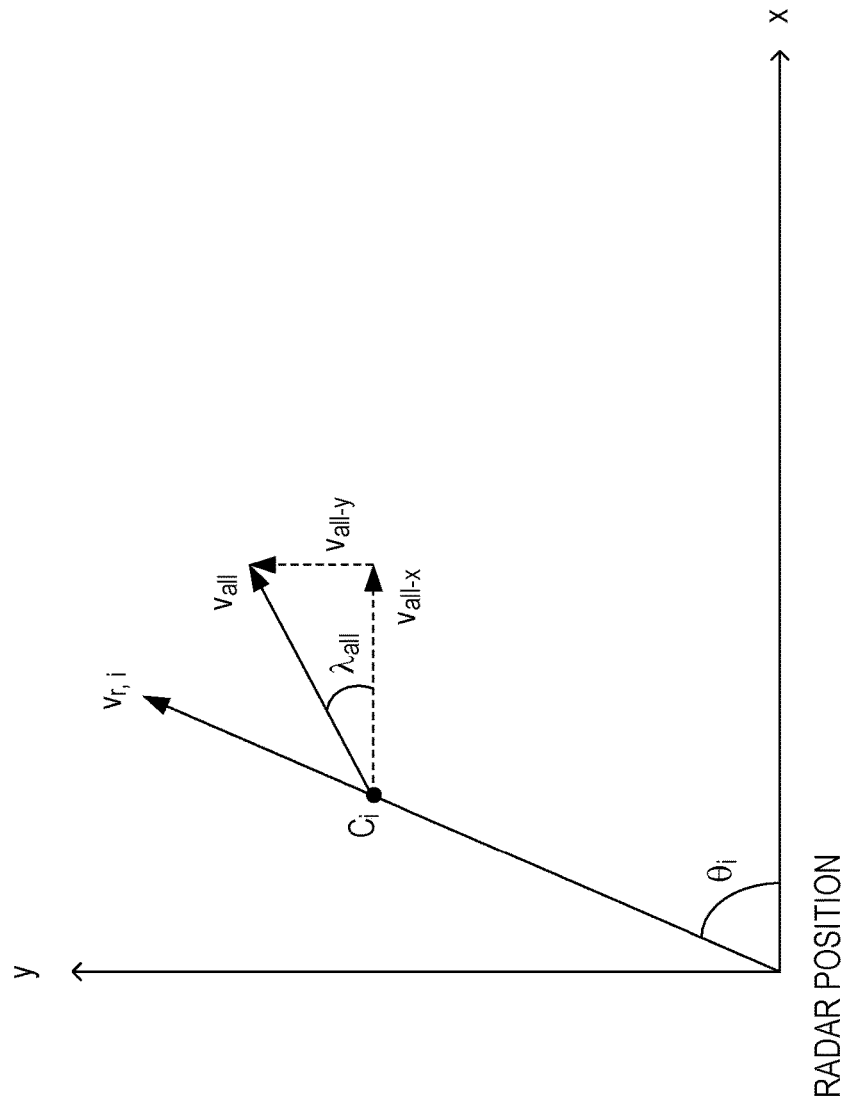
FIG. 4 is a diagram illustrating an example of a radar measurement space, which is a space where a radar device can detect an object.

FIG. 4 is a diagram illustrating an example of a radar measurement space which is a space where the radar device 20 can detect an object. In FIG. 4, for simplicity of illustration, the height direction (z-axis) is omitted and a two-dimensional coordinate system (x-axis, y-axis) corresponding to the ground is illustrated. In FIG. 4, $C_i$ (i=1 to N) is one of capture points belonging to a certain cluster. In addition, N is a total number of capture points included in the cluster to which $C_i$ belongs. An azimuth measurement value corresponding to each $C_i$, which is determined from the Doppler speed profile, is $\theta_i$ and a Doppler speed measurement value is $v_{r,i}$. Supposing that azimuth of a traveling direction corresponding to all capture points $C_i$ in the cluster is $\lambda_{all}$ and a value of a traveling speed corresponding to all the capture points $C_i$ in the cluster is $v_{all}$, the following formula (1) is satisfied. A relationship in formula (1) corresponds to the restriction relation between the azimuth measurement value and the Doppler speed measurement value described above.

$$v_{r,i} = v_{all} \cos(\lambda_{all} - \theta_i) \qquad (1)$$

Here, if all capture points in the cluster to which $C_i$ belongs is an object moving at the same speed, all capture points $C_i$ (i=1 to N) in the cluster satisfy the above formula (1). In formula (1), however, the traveling speed $v_{all}$ and the traveling direction $\lambda_{all}$ corresponding to all capture points in the cluster are unknown values.

$v_{all}$ and $\lambda_{all}$ in formula (1) can be determined with the following two methods to be described below. The following two methods are now described.

A first method is a calculation method by regression calculation. In FIG. 4, for each of the capture points $C_i$ (i=1 to N), if an azimuth measurement value corresponding to each capture point $C_i$ determined from the Doppler speed profile is $\theta_i$ and a Doppler speed measurement value is $v_{r,i}$, the following formula (2) is satisfied:

$$v_{r,i} = v_{all-x} \cos(\theta_i) + v_{all-y} \sin(\theta_i) \qquad (2)$$

In formula (2), $v_{all-x}$ and $v_{all-y}$ represent a speed of the entire cluster including $C_i$, more specifically, a component x and a component y of the speed of the entire object. With formula (2), parameters $v_{all-x}$ and $v_{all-y}$ can be calculated from N measurement values (azimuth and traveling speed) through a publicly known regression calculation such as the least square method, for example. Then, using the calculated $v_{all-x}$ and $v_{all-y}$, the traveling speed $v_{all}$ and the traveling direction $\lambda_{all}$ corresponding to all capture points in the cluster can be calculated from the following formula (3) and formula (4):

$$v_{all} = \sqrt{v_{all-x}^2 + v_{all-y}^2} \qquad (3)$$

$$\lambda_{all} = arctg\left(\frac{v_{all-y}}{v_{all-x}}\right) \qquad (4)$$

The regression calculation described above may be repeatedly carried out a few times. More specifically, based on a computed regression calculation result, a capture point with a large error (measurement error due to a radar device, resulting from noise, for example) is eliminated and regression calculation is carried out again. This improves the calculation accuracy of the traveling speed $v_{all}$ and the traveling direction $\lambda_{all}$ corresponding to all capture points $C_i$ in the cluster to be calculated. In the present disclosure, there is no limitation on a specific method of the regression calculation.

Figure 5:
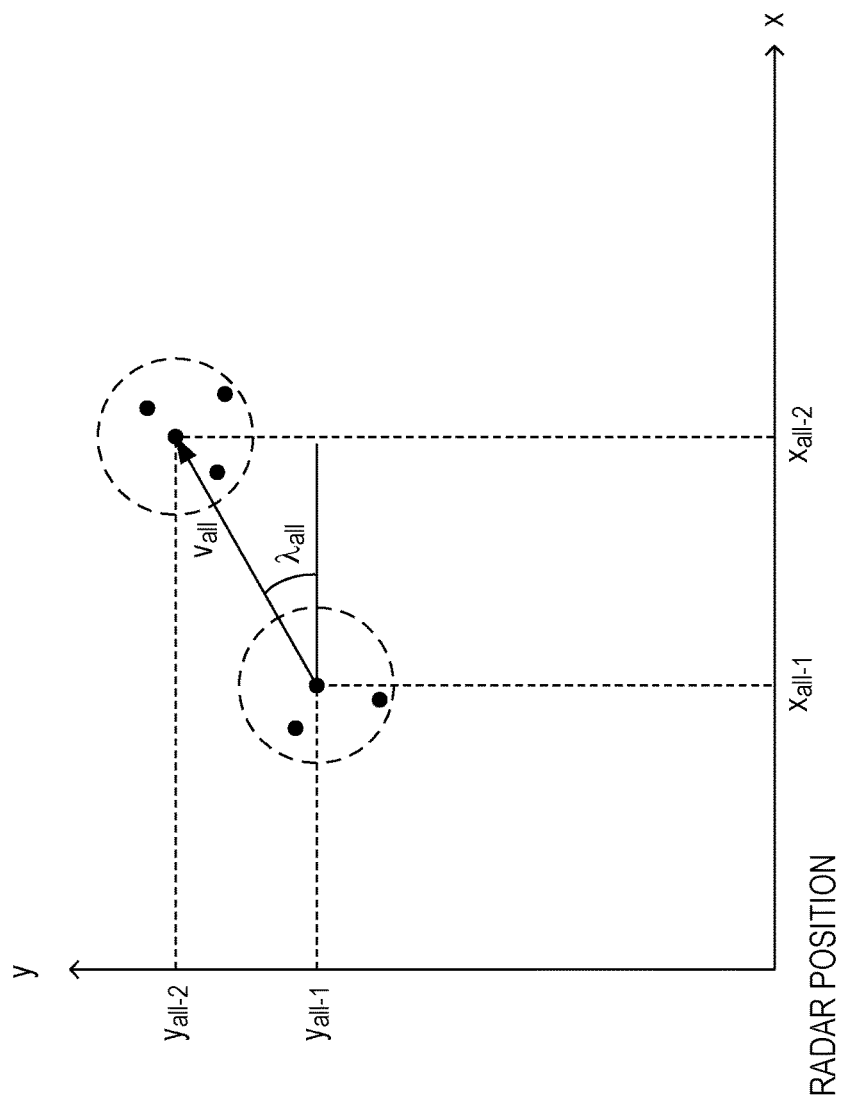
FIG. 5 is a diagram illustrating movement of a cluster as time elapses.

A second method is a method of tracking movement of an object as time elapses and utilizing information obtained through tracking to calculate the traveling speed $v_{all}$ and the traveling direction $\lambda_{all}$ corresponding to all capture points $C_i$ in the cluster. Specifically, using at least one of the electric power profile and the Doppler speed profile, as illustrated in FIG. 5, if a position of an object (center of a cluster) at current time is ($x_{all-2}$, $y_{all-2}$) and a center position of a cluster which is one cycle ago in the radar measurement cycle is ($x_{all-1}$, $y_{all-1}$), the traveling speed $v_{all}$ and the traveling direction $\lambda_{all}$ corresponding to all capture points $C_i$ in the cluster can be calculated with the following formulas (5) and (6). Note that FIG. 5 is a conceptual diagram illustrating movement of the cluster as time elapses. In FIG. 5, the height direction (z-axis) is omitted and a two-dimensional coordinate system (x-axis, y-axis) corresponding to the ground is illustrated. In addition, a position of the center of the cluster is an average of position information of the capture point $C_i$ in each cluster.

$$v_{all} = \sqrt{\left(\frac{x_{all-2} - x_{all-1}}{T}\right)^2 + \left(\frac{y_{all-2} - y_{all-1}}{T}\right)^2} \quad (5)$$

$$\lambda_{all} = arctg\left(\frac{y_{all-2} - y_{all-1}}{x_{all-2} - x_{all-1}}\right) \quad (6)$$

Here, T represents a cycle of radar measurement which is time for the cluster to move from the position $(x_{all-1}, y_{all-1})$ to the position $(x_{all-2}, y_{all-2})$.

Figure 6:
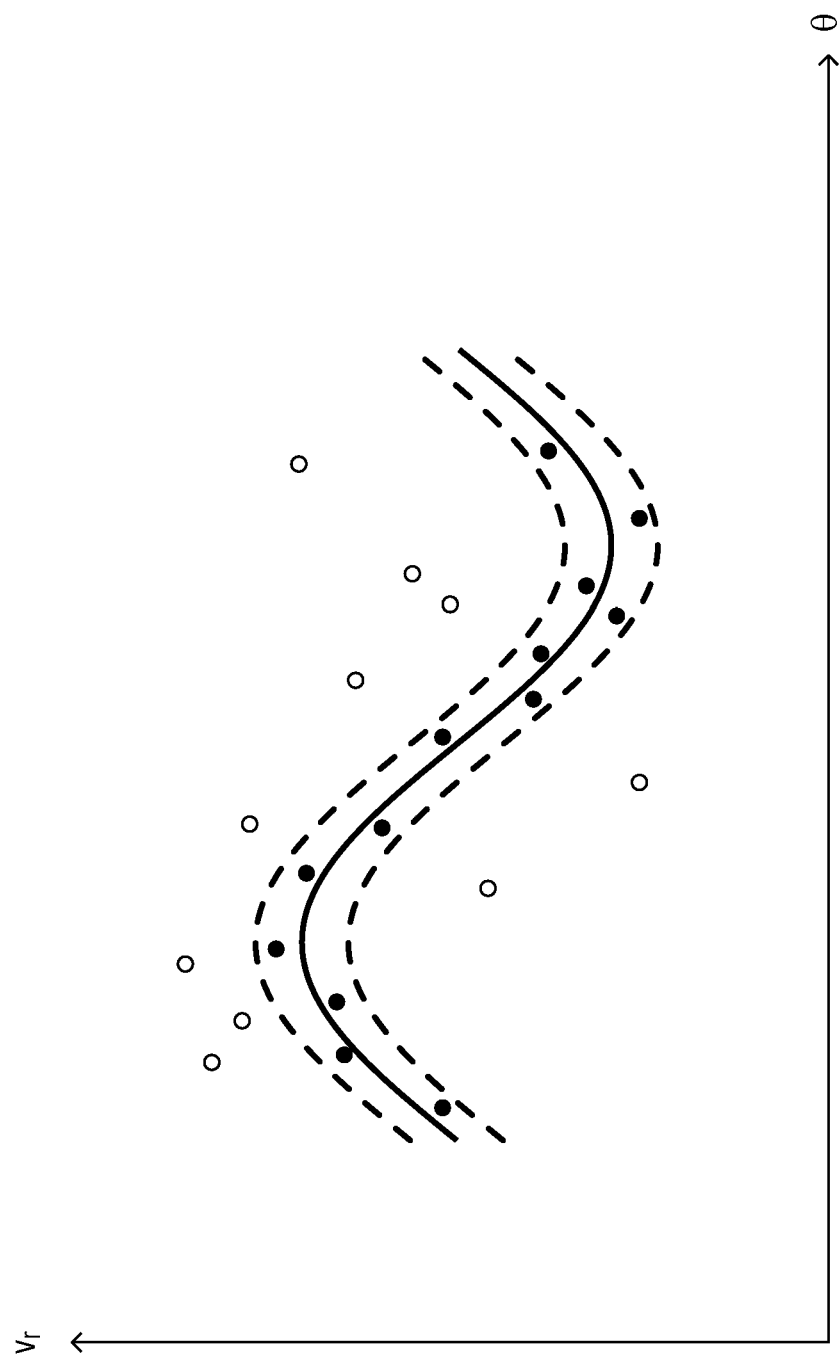
FIG. 6 is a diagram illustrating a curve in formula (1) in a $\theta$-$v_r$ coordinate system and an example of a distance with each capture point.

FIG. 6 is a diagram illustratively showing a distance between a curve of formula (1) in the $\theta$-$v_r$ coordinate system and each capture point. The sub-cluster generator 13 divides all capture points belonging to the cluster into two types of sub-clusters, based on formula (1) having as parameters the traveling speed $v_{all}$ and the traveling direction $\lambda_{all}$ corresponding to all capture points $C_i$ in the cluster that are thus determined. Specifically, as illustrated in FIG. 6, the sub-cluster generator 13 divides each cluster into two types of sub-clusters including one or more sub-cluster (first sub-cluster) in which the distance between the curve of formula (1) in the $\theta$-$v_r$ coordinate system and each capture point is large and a sub-cluster (second sub-cluster) having a small distance. In addition, if a plurality of sub-clusters with a small distance are generated, in subsequent processing, one of the sub-clusters may be used as a typical value or the plurality of sub-clusters may be integrated and used.

Specifically, as illustrated in FIG. 6, for example, the sub-cluster generator 13 provides curves $v_r=(v_{all}\pm\Delta v)\cos(\lambda_{all}-\theta)$ (dotted-line curves illustrated in FIG. 6) above and below a curve $v_r=v_{all}\cos(\lambda_{all}-\theta)$ (solid-line curve illustrated in FIG. 6). The sub-cluster generator 13 divides capture points (black circles) located in an area surrounded by dotted-line curves and those (white circles) located out of the area surrounded by the dotted-line curves, respectively, into two different types of sub-clusters.

Here, $\Delta v$ is a threshold that is set appropriately. For example, when an object is a vehicle, it is highly likely that capture points located in the area surrounded by the dotted-line curves result from reflections of any vehicle body other than wheels. It is also highly likely that capture points located out of the area surrounded by the dotted-line curves result from reflections of the wheels.

As such, based on a traveling direction or a traveling speed of each capture point, the sub-cluster generator 13 divides each cluster into the second sub-cluster corresponding to movement of a main part of an object and one or more first sub-clusters each corresponding to a part of the object having a different traveling direction or traveling speed from the main part of the object.

The speed calculator 14 uses the capture points (black circles illustrated in FIG. 6) in the area surrounded by the dotted-line curves to calculate an actual traveling speed $v_{target}$ of an object and an actual traveling direction $\lambda_{target}$ of the object from the following formula (2-2), formula (3-2), and formula (4-2). More specifically, the speed calculator 14 uses one or more capture points belonging to the second sub-cluster corresponding to movement of the vehicle body other than the wheels to calculate a cluster speed.

$$v_{target-r,i} = v_{main-x}\cos(\theta_{mi}) + v_{main-y}\sin(\theta_{mi}) \quad (2\text{-}2)$$

$$v_{target} = \sqrt{v_{main-x}^2 + v_{main-y}^2} \quad (3\text{-}2)$$

$$\lambda_{target} = arctg\left(\frac{v_{main-y}}{v_{main-x}}\right) \quad (4\text{-}2)$$

In addition, $v_{main-x}$ and $v_{main-y}$ are values obtained by using one or more capture points $C_{mi}$ (mi=1 to M, M<N) included in the second sub-cluster corresponding to the movement of the main part of the object.

Thus, the speed calculator 14 can improve calculation accuracy of a traveling speed of the main part of the object, by controlling any effect partly attributable to the part of the object having a different traveling direction or traveling speed from the main part of the object. When an object is a vehicle, for example, a part of the object is a wheel part. When an object is a person, a part of the object is his/her hand or foot or the like. Note that since the speed calculator 14 calculates an actual traveling speed $v_{target}$ using formula (3-2), the actual traveling speed $v_{target}$ is a speed (two-dimensional speed) having a component x and a component y of a cluster, and not a Doppler speed (one-dimensional speed: speed in a specific orientation direction of a radar device) of the cluster.

In addition, the calculation accuracy of parameters may be improved by recursively performing generation of two types of sub-clusters by the sub-cluster generator 13 and calculation of the actual traveling speed $v_{target}$ and the actual traveling direction $\lambda_{target}$ by the speed calculator 14 repeatedly.

The tracker 15 performs a tracking process of a cluster by using a publicly known technique such as an $\alpha\beta$ filter or a Kalman filter. For a speed, however, as a tracking element, the tracker 15 performs tracking of a two-dimensional speed, and not tracking of a Doppler speed. In addition, when calculating a cluster speed, the tracker 15 uses all capture points included in the second sub-cluster in the area surrounded by the dotted-line curves illustrated in FIG. 6, rather than all capture points in the cluster. More specifically, the tracker 15 tracks movement of the main part of the object, and not the part of the object.

In the following, an example of tracking in which the tracker 15 uses an $\alpha\beta$ filter is described. Formulas (7) to (10) listed below illustrate processing of the $\alpha\beta$ filter:

$$X_{sk} = X_{pk} + \alpha(X_{ok} - X_{pk}) \quad (7)$$

$$V_{sk} = V_{pk} + \beta(V_{ok} - V_{pk}) \quad (8)$$

$$X_{pk} = X_{sk-1} + T \cdot V_{sk-1} \quad (9)$$

$$V_{pk} = V_{sk-1} \quad (10)$$

In formulas (7) to (10), X represents a two-dimensional position vector of a cluster represented by the following formula (11), and V represents a two-dimensional speed vector of the cluster represented by the following formula (12):

$$X = \begin{bmatrix} x_{target} \\ y_{target} \end{bmatrix} \quad (11)$$

$$V = \begin{bmatrix} v_{target-x} \\ v_{target-y} \end{bmatrix} \quad (12)$$

In formula (7), a cluster smoothing position $X_{sk}$ is calculated using a prediction position $X_{pk}$ of a cluster and a measurement position $X_{ok}$ of the cluster. Weighting is adjusted by using a parameter α. Note that a smoothing position is an estimated position of the cluster at sampling time k.

In formula (8), a smoothing speed $V_{sk}$ of a cluster is calculating using a prediction speed $V_{pk}$ of the cluster and a measurement speed $V_{ok}$ of the cluster. Weighting is adjusted by using a parameter β. Note that the smoothing speed is an estimated speed of the cluster at sampling time k.

The prediction position $X_{pk}$ is calculated with formula (9). In addition, the prediction speed $V_{pk}$ is calculated with formula (10). Formula (9) and formula (10) express movement of an object with an isokinetic model. In formula (9) and formula (10), the prediction position $X_{pk}$ and the prediction speed $V_{pk}$ at the time k are calculated using the smoothing position $X_{sk-1}$ and the smoothing speed $V_{sk-1}$.

The tracker 15 uses all capture points belonging to the second sub-cluster and defines an average position of all the capture points as a measurement position $X_{ok}$ of the cluster. Note that an average position may be calculated using one or more capture point. Furthermore, the tracker 15 defines the speed calculated by the speed calculator 14 as the measurement speed $V_{ok}$ of the cluster. More specifically, the measurement speed $V_{ok}$ is determined dependent on one or more capture points belonging to the second sub-cluster, and not on all the capture points of the cluster.

Note that there is no specific limitation of the present disclosure on a method of selecting the parameters α and β or a method of activating tracking or the like in the tracker 15, and a publicly known method may be used.

The object determiner 16 identifies a type (vehicle or pedestrian, or the like) of an object detected by the radar device 20 using a publicly known template matching method or the like, based on distribution shape of capture points, reflection intensity distribution illustrated in FIG. 2A and FIG. 2B, Doppler speed distribution, or a smoothing speed or the like which are a tracking result by the tracker 15. The present disclosure does not limit an object identification method by the object determiner 16. A publicly known technique may be used for the object identification method. Then, the object determiner 16 outputs information related to an object such as a position or a traveling speed of a detected object or the like to the vehicle control system 30.

Figure 7:
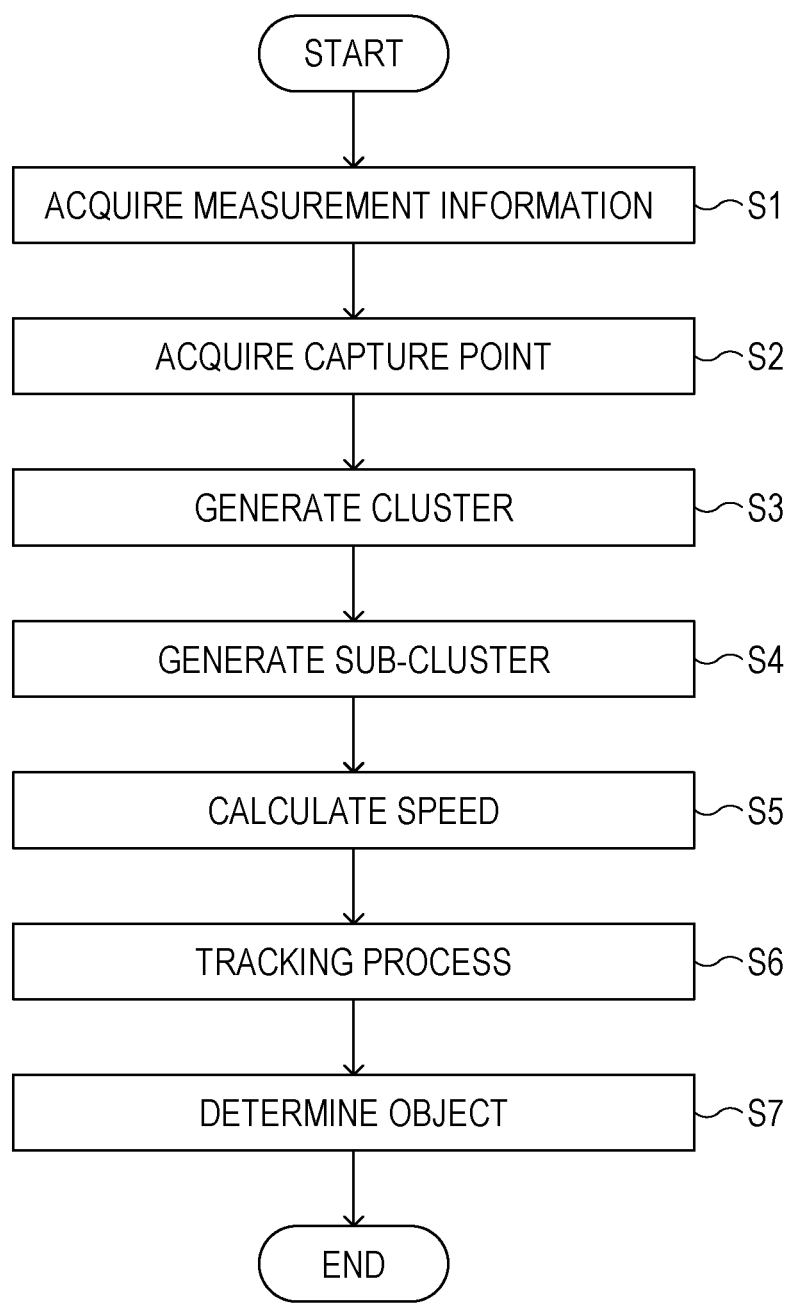
FIG. 7 is a diagram illustrating an operation example of the object detection device according to the first embodiment.

An example of operation of the object detection device 10 according to the first embodiment is described hereinafter. FIG. 7 is a flowchart illustrating an operation example of the object detection device 10. In step S1, the capture point acquirer 11 acquires measurement information from the radar device 20. Then, in step S2, the capture point acquirer 11 extracts and acquires a plurality of capture points based on the measurement information.

In step S3, the cluster generator 12 generates a cluster by clustering a plurality of capture points. Then, in step S4, the sub-cluster generator 13 divides the cluster generated by the cluster generator 12 into two types of sub-clusters.

In step S5, the speed calculator 14 calculates a two-dimensional speed of the cluster, using one or more capture points belonging to a second sub-cluster corresponding to a main part of the object, of two types of sub-clusters generated by the sub-cluster generator 13.

In step S6, the tracker 15 performs a tracking process. Specifically, the tracker 15 calculates a cluster prediction position $X_{pk}$ and a cluster prediction speed $V_{pk}$ in the current radar measurement cycle, by using a cluster smoothing position $X_{sk-1}$ and a cluster smoothing speed $V_{sk-1}$ in the radar measurement cycle of one cycle ago. Then, the tracker 15 defines an average position of all capture points belonging to a second cluster as a cluster measurement position $X_{ok}$ and the speed calculated by the speed calculator 14 as a cluster measurement speed $V_{ok}$. The tracker 15 calculates a smoothing position $X_{sk}$ of the current radar measurement cycle based on the measurement position $X_{ok}$ and the prediction position $X_{pk}$ and calculates a smoothing speed $V_{sk}$ based on the measurement speed $V_{ok}$ and the prediction speed $V_{pk}$.

In step S7, the object determiner 16 identifies an object type based on the tracking result of the tracker 15 or the like and outputs a identification result.

As described above, the object detection device 10 according to the first embodiment of the present disclosure has a capture point acquirer to which measurement information including at least one of an electric power profile and a Doppler speed profile generated by one or more radar devices using reflected wave from an object is inputted and which uses the measurement information and acquires, as two or more capture points, two or more unit areas that have captured the object from a plurality of unit areas into which measurement range of the one or more radar devices is divided for a distance and azimuth; a cluster generator that generates a cluster including the two or more capture points; a sub-cluster generator that divides the cluster into one or more first sub-clusters each corresponding to a part of the object having a different traveling direction or traveling speed from a traveling direction or a traveling speed of a main part of the object and a second sub-cluster corresponding to the main part of the object; a speed calculator that uses one or more capture points belonging to the second sub-cluster and calculates a traveling speed of the object; and a traveling direction or a traveling speed.

With such a configuration, the object detection device 10 according to the first embodiment divides the cluster corresponding to the object detected based on the radar measurement result into the second sub-cluster corresponding to the main part of the object and the one or more first sub-clusters each corresponding to the part of the object having a different traveling direction or a traveling speed from the main part of the object. When an object is a vehicle, for example, a part of the object is a wheel part. When an object is a person, a part of the object is his/her hand or foot or the like. Then, when calculating a cluster speed, the object detection device 10 according to the first embodiment performs calculation of a cluster speed using one or more capture points belonging to the second sub-cluster corresponding to the main part of the object. Thus, the object detection device 10 according to the first embodiment can accurately calculate the traveling speed of the main part of the object, by controlling effect partly attributable to the part of the object having the different traveling direction or traveling speed from the main part of the object.

Therefore, since the object detection device 10 according to the first embodiment can accurately detect a cluster moving speed, the object detection device 10 can perform a subsequent cluster tracking process or identification process of an object type using a tracking result with high accuracy.

In addition, using formula (1), the object detection device 10 according to the first embodiment calculates a speed of an object on a plane (two-dimensional speed), and not a Doppler speed (one-dimensional speed). If a part of an object having a different traveling direction or traveling speed from a main part of the object is present, it is difficult to accurately track the Doppler speed of the main part of the object. Accordingly, the object detection device 10 according to the first embodiment can compensate for the Doppler speed of the main part of the object by calculating a precise two-dimensional speed.

In addition, the object detection device 10 according to the first embodiment may output the number and the positions of the first sub-clusters, and the size and the speed distribution of each first sub-cluster, as information related to the first sub-cluster included in the information related to the object. The object determiner 16 can sense information related to a specific part of an object by using at least one piece of the information related to the first sub-cluster, and perform a process to determine object status (for example, vehicle type identification, determination of the number of people).

For example, when the information related to the first sub-cluster reflects wheels, the object determiner 16 can discriminate the vehicle type (two-wheeled vehicle, passenger vehicle, large-size vehicle, for example) by using at least one piece of the information related to the first sub-cluster and sensing the number and positions of the wheels. In addition, when the information related to the sub-cluster reflects behavior of a pedestrian's hand or foot, the object determiner 16 can determine the number of people by using at least one piece of the information related to the first sub-cluster and sensing the number of hands or feet of the pedestrian(s).

Then, as described above, the object detection device 10 according to the first embodiment can accurately determine a speed of an object (another vehicle, pedestrian, two-wheeled car, for example) present around a vehicle on which the radar device 20 is mounted. The object detection device 10 outputs information including a traveling speed of the object to the vehicle control system 30. If the vehicle control system 30 determines that there is a possibility of collision of the vehicle and the object, the vehicle control system 30 gives a driver a warning or controls running of the vehicle to avoid a collision. If the vehicle control system 30 determines that there is a possibility of a collision of the vehicle and the object, the vehicle control system 30 can give a warning or perform control for avoiding a collision. Consequently, traffic accidents are reduced.

In addition, the object detection device 10 according to the first embodiment may be connected to the radar device 20 installed around a road. This enables prediction of a possibility of a collision with an object (vehicle, two-wheeled car, and pedestrian) at a crossing or the like, avoidance of a collision, and tracking and management of traffic volume. Consequently, traffic accidents are reduced and efficiency of traffic management is improved.

Alternatively, the object detection device 10 according to the first embodiment may be connected to the radar device 20 that monitors an airport, a building, or facilities, for example. With this, a small-size flying object or a bird, an intruder or the like are accurately detected, and thus safety of facilities is ensured.

Second Embodiment

Figure 8:
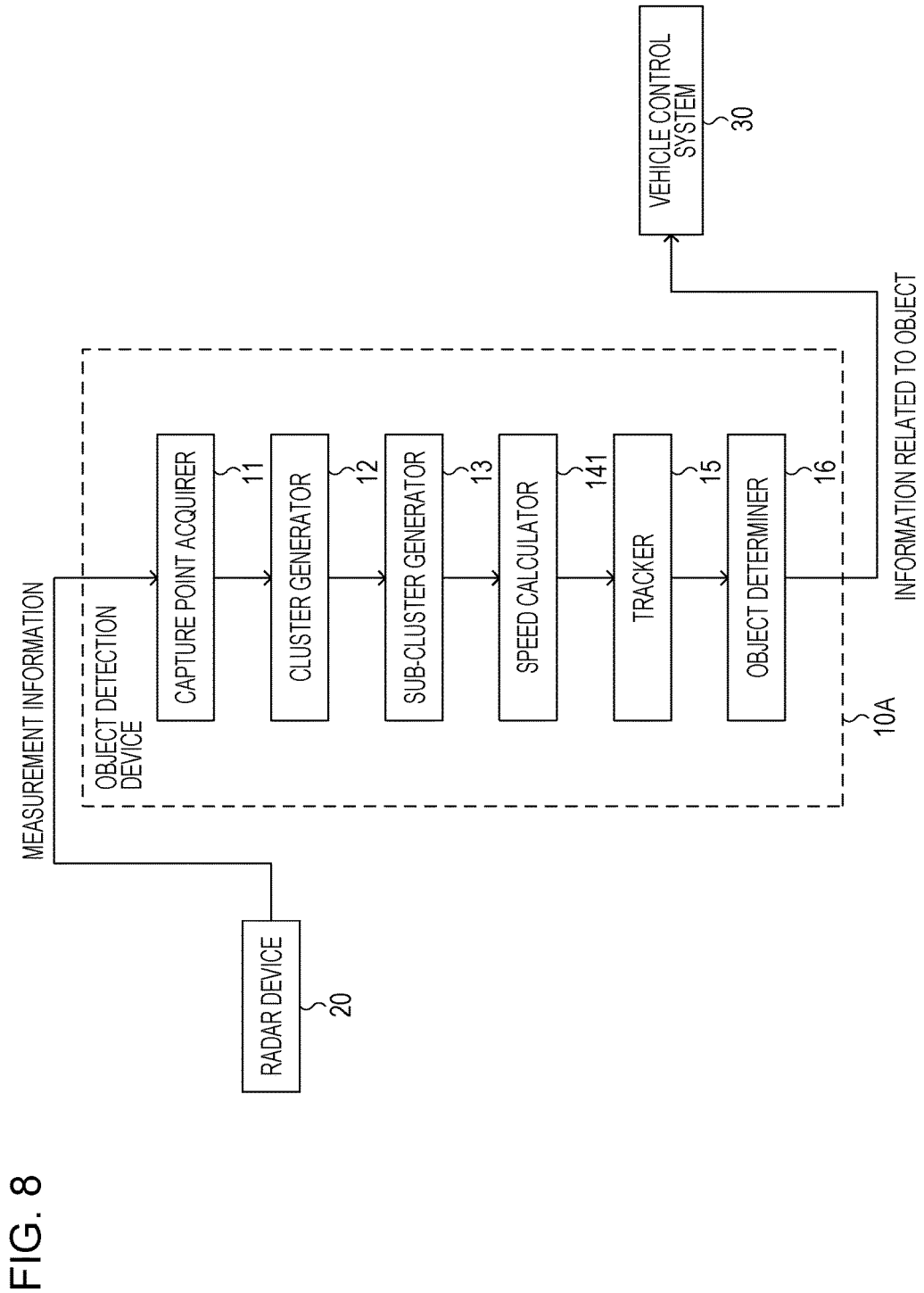
FIG. 8 is a diagram illustrating a main configuration of an object detection device according to a second embodiment of the present disclosure and a connection relation of a radar device and a vehicle control system.

FIG. 8 is a block diagram illustrating a main configuration of an object detection device 10A according to a second embodiment of the present disclosure and a connection relation of a radar device 20 and a vehicle control system 30. In FIG. 8, the same reference numeral as FIG. 1 is assigned to a configuration common to FIG. 1 and a detailed description is omitted. The object detection device 10A illustrated in FIG. 8 has a speed calculator 141. The speed calculator 141 acts differently from the speed calculator 14 in the object detection device 10 according to the first embodiment.

The speed calculator 14 of the first embodiment calculates a cluster speed by using a two-dimensional speed. However, the speed calculator 141 of the second embodiment calculates a cluster speed by using an average of Doppler speeds of one or more capture points belonging to a second sub-cluster corresponding to a main part of an object. In the second embodiment, since a Doppler speed is used to calculate a cluster speed, formula (1) used to calculate a cluster speed in the first embodiment is not used. The speed $v_{all}$ in formula (1) is not a Doppler speed but a speed of an object on a plane. The speed calculator 141 may use a publicly known speed calculation method, for example. Specifically, the speed calculator 141 may define an average of Doppler speeds of one or more capture points belonging to the second sub-cluster as a cluster measurement speed $V_{ok}$ and use formula (8) to calculate a cluster smoothing speed $V_{sk}$.

As described above, the object detection device 10A according to the second embodiment of the present disclosure has a capture point acquirer to which measurement information including at least one of an electric power profile and a Doppler speed profile generated by one or more radar devices using reflected wave from an object is inputted and which uses the measurement information and acquires, as two or more capture points, two or more unit areas that have captured the object from a plurality of unit areas into which measurement range of the one or more radar devices is divided for a distance and azimuth; a cluster generator that generates a cluster including the two or more capture points; a sub-cluster generator that divides the cluster into one or more first sub-clusters each corresponding to a part of the object having a different traveling direction or traveling speed from a traveling direction or a traveling speed of a main part of the object and a second sub-cluster corresponding to the main part of the object; a speed calculator that uses one or more capture points (average of Doppler speeds of capture points) belonging to the second sub-cluster and calculates a traveling speed of the object; and a traveling direction or a traveling speed.

With such a configuration, similar to the first embodiment, the object detection device 10A according to the second embodiment divides the cluster corresponding to the object detected based on the radar measurement result into the second sub-cluster corresponding to the main part of the object and the one or more first sub-clusters each corresponding to the part of the object having a different traveling direction or a traveling speed from the main part of the object. Then, when calculating a cluster speed, the object detection device 10A calculates a cluster speed using one or more capture points belonging to the second sub-cluster corresponding to the main part of the object. Thus, the object detection device 10A according to the second embodiment can accurately calculate the traveling speed of the main part of the object, with no effect partly attributable to the part of the object having the different traveling direction or traveling speed from the main part of the object. In addition, the object detection device 10A according to the second embodiment can improve accuracy of speed calculation even if the regression calculation accuracy cannot be ensured due to the insufficient number of capture points for calculating a second-dimensional speed from Doppler speeds.

Third Embodiment

Figure 9:
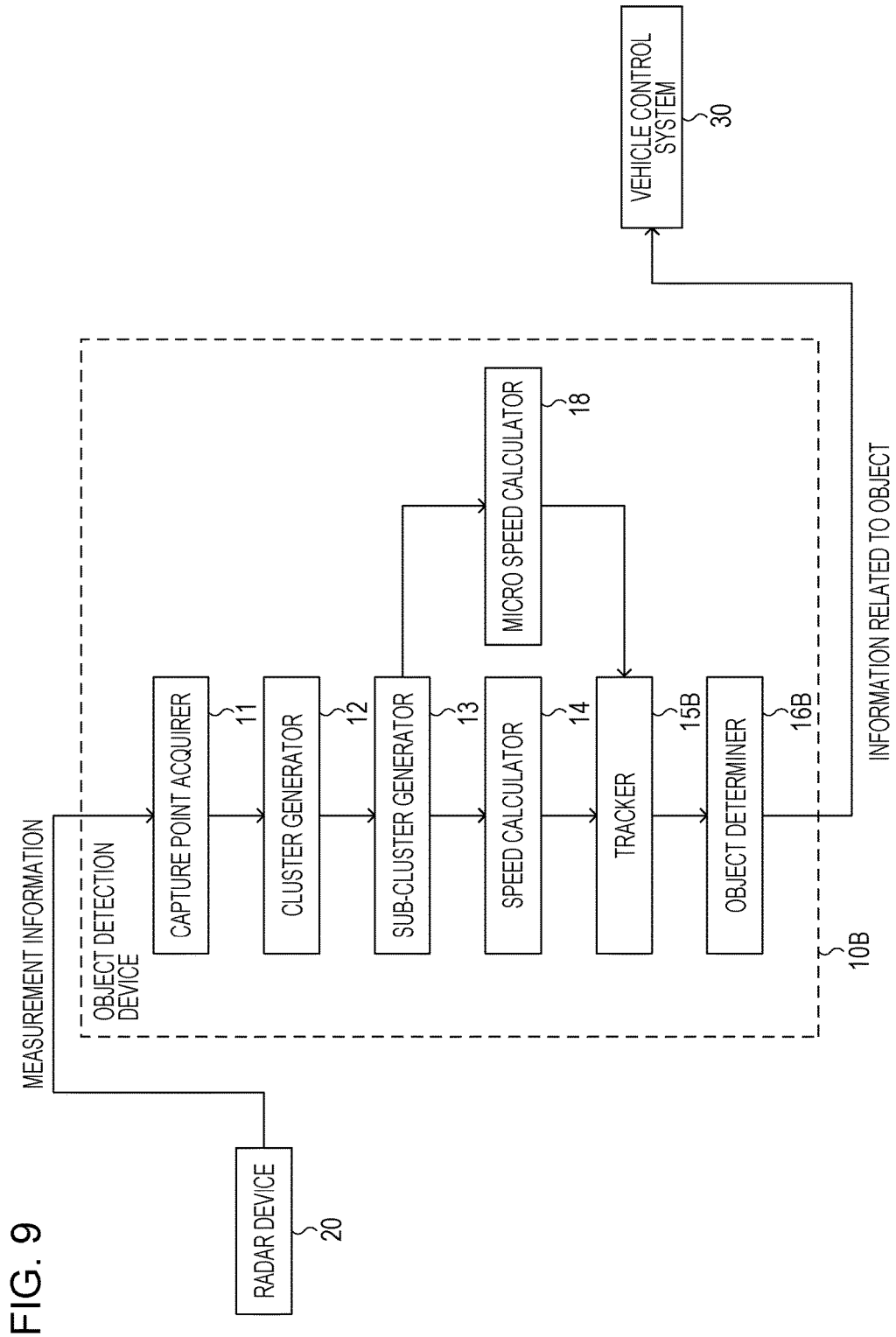
FIG. 9 is a diagram illustrating a main configuration of an object detection device according to a third embodiment of the present disclosure and a connection relation of a radar device and a vehicle control system.

FIG. 9 is a block diagram illustrating a main configuration of an object detection device 10B according to a third embodiment of the present disclosure and a connection relation of a radar device 20 and a vehicle control system 30. In FIG. 9, the same reference numeral as FIG. 1 is assigned to a configuration common to FIG. 1 and a detailed description is omitted. As illustrated in FIG. 9, the object detection device 10B according to the third embodiment has a micro speed calculator 18 inserted between the sub-cluster generator 13 and the tracker 15 of the object detection device 10 according to the first embodiment. In addition, in the object detection device 10B according to a third embodiment, a tracker 15B replaces the tracker 15 in the first embodiment and an object determiner 16B replaces the object determiner 16 in the first embodiment.

The micro speed calculator 18 calculates an average of Doppler speeds of one or more capture points (capture points (white circles) located out of the area surrounded by the dotted-line curves illustrated in FIG. 6) belonging to one or more first sub-clusters each corresponding to a part of the object. The micro speed calculator 18 defines an average of the Doppler speeds as a cluster micro speed $v_{micro}$. More specifically, the micro speed $v_{micro}$ corresponds to a speed of the part of the object having the different traveling direction or traveling speed from the main part of the object.

The tracker 15B expands a dimension of a speed vector V used in tracking. For example, if the αβ filter is used, the speed vector V is expanded as illustrated below:

$$V = \begin{bmatrix} v_{target-x} \\ v_{target-y} \\ v_{micro} \end{bmatrix} \quad (13)$$

In the formula (13), $v_{micro}$ is a speed calculated by the micro speed calculator 18. Since $v_{micro}$ is a speed of the part of the object having the different is traveling direction or traveling speed from the main part of the cluster (object), in the third embodiment, $v_{micro}$ is used as characteristic amount for object identification.

The object determiner 16B implements object identification by adding a characteristic of a micro speed to a characteristic used by the object determiner 16 of the first embodiment. The object determiner 16B can perform object identification more accurately by understanding a change in the micro speed $v_{micro}$ in chronological order.

As described above, the object detection device 10B according to the third embodiment further has a tracker that uses one or more capture points belonging to the one or more first cluster and one or more capture points belonging to the second sub-cluster and performs a tracking process on both the one or more first sub-clusters and the second sub-cluster.

With such a configuration, the object detection device 10B according to the third embodiment tracks both the second sub-cluster corresponding to the main part of the object and the one or more first sub-clusters each corresponding to the part of the object having the different traveling direction or traveling speed from the main part of the object and identifies an object type using a position and speed of the object obtained from both sub-clusters. Thus, identification accuracy of an object type improves.

Specifically, when two types of flying objects, a small flying object referred to as a drone and a bird, are present in a detection range of the radar device 20, for example, a revolving speed of a propeller, which is a part of the small flying object, for example, is apparently faster than a clapping speed of a wing, which is a part of the bird, even though traveling speeds of main parts of the two types of flying objects are same. Consequently, the object detection device 10B according to the third embodiment can accurately identify the small flying object and the bird by calculating a speed of the part of the flying object. In addition, when either one of the flying objects is present in the detection range of the radar device 20, the object detection device 10B can accurately identify the flying objects by acquiring in advance information such as the revolving speed of the propeller part of the small flying object or the clapping speed of the bird's wings or the like. The object detection device 10B according to the third embodiment can accurately discriminate between a bicycle pushed by hands and a pedestrian, between a bicycle and a running person or the like, in addition to between the small flying object and the bird described above.

Fourth Embodiment

Figure 10:
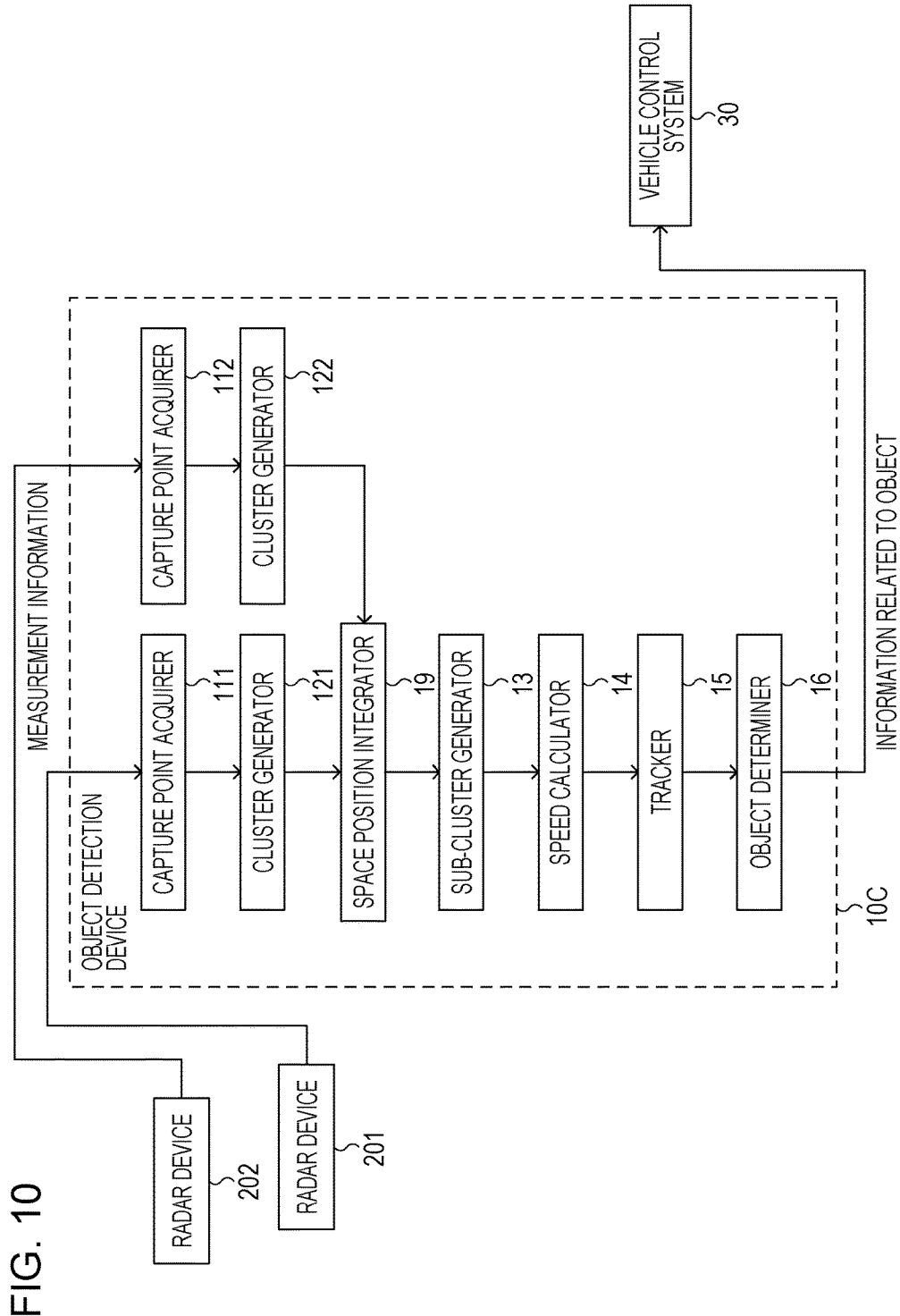
FIG. 10 is a diagram illustrating a main configuration of an object detection device according to a fourth embodiment of the present disclosure and a connection relation of two radar devices and a vehicle control system.

FIG. 10 is a block diagram illustrating a main configuration of an object detection device 10C according to a fourth embodiment of the present disclosure and a connection relation of two radar devices 201 and 202 and a vehicle control system 30. In FIG. 10, the same reference numeral as FIG. 1 is assigned to a configuration common to FIG. 1 and a detailed description is omitted. The object detection device 10C according to the fourth embodiment has two capture point acquirers 111 and 112, two cluster generators 121 and 122, and a space position integrator 19 inserted.

Figure 11:
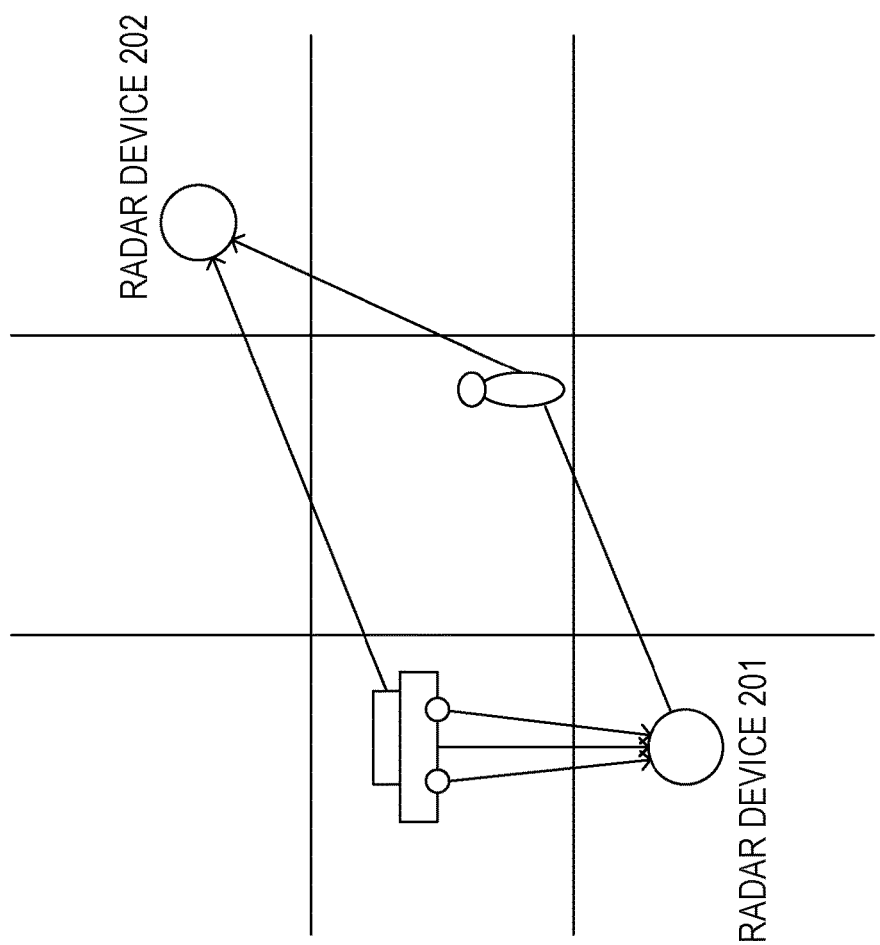
FIG. 11 is a diagram illustrating an example of arrangement of the two radar devices.

As illustrated in FIG. 10 and FIG. 11, in the fourth embodiments, the two radar devices (radar device 201 and radar device 202) are installed at different space positions. FIG. 11 is a diagram illustrating an example of arrangement of the two radar devices 201 and 202.

The capture point acquirer 111 acquires a plurality of capture points, using measurement information outputted from the radar device 201. The cluster generator 121 generates a cluster by clustering the plurality of capture points. Similarly, the capture point acquirer 112 acquires a plurality of capture points, using the measurement information outputted from the radar device 202. The cluster generator 122 generates a cluster by clustering the plurality of capture points.

The space position integrator 19 sets the same reference coordinate system for the radar device 201 and the radar device 202. The space position integrator 19 uses the coordinate system of the radar device 201 as a reference coordinate system. Then, the space position integrator 19 determines based on the set positions of the respective radar devices 201 and 202 whether respective clusters generated by the cluster generators 121 and 122 correspond to the same object.

Then, if the space position integrator 19 determines that respective clusters correspond to the same object, the space position integrator 19 integrates captures points acquired by the capture point acquirers 111 and 112. For example, if the capture points acquired by the capture point acquirer 111 is $C1_i$ (i=1 to N) and the capture points acquired by the capture point acquirer 112 is $C2_j$ (j=1 to M), the number of capture points after integration is N+M.

In addition, the space position integrator 19 performs a parameter adjustment process due to a difference between the set positions of the radar devices 201 and 202. The parameter adjustment process is a process to correct a difference of azimuth of respective radar devices 201 and 202. This is because when respective radar devices 201 and 202 measure the same object, each of azimuth angles of the object differs.

The sub-cluster generator 13, the speed calculator 14, the tracker 15, and the object determiner 16 perform similar actions to the first embodiment described above on the N+M capture points.

As described above, the object detection device 10C according to the fourth embodiment further has a space position integrator that sets the same coordinate system for a plurality of radar devices installed at mutually different positions. The capture point acquirer has a plurality of pieces of the measurement information, which are mutually different, inputted from the plurality of radar devices, and acquires two or more capture points that have captured the object for each of the radar devices based on each of the measurement information. The cluster generator generates the cluster for each of the radar devices. The space position integrator integrates the clusters and the sub-cluster generator divides the integrated clusters into the one or more first sub-clusters and the second sub-cluster.

With such a configuration, in the object detection device 10C according to the fourth embodiment, radar devices are each installed at two locations, for example. When object detection of a spot that needs monitoring, such as a crossing, is performed, each object present in a crossing, such as a vehicle, pedestrian, a two-wheeled car or the like, can be accurately detected. Since this enables collision prediction or the like of the objects, action such as issuance of alert can be taken.

In addition, in the fourth embodiment described above, while the capture point acquirer and the cluster generator are provided for each of the radar devices 201 and 202, the present disclosure is not limited thereto. For example, one capture point acquirer and one cluster generator may respectively acquire measurement information from two radar devices 201 and 202, process the information separately, and integrate the separately processed clusters at the space position integrator 19.

The embodiments of the object detection device are described above. The embodiments are simply an example of the object detection devices of the present disclosure and various modifications may be made thereto. In addition, respective embodiments described above may be combined appropriately. For example, the micro speed calculator and the tracker described in the third embodiment may be added to the object detection device 10C according to the fourth embodiment. In such a case, the object detection device can acquire a micro speed of an object from different directions and improve the object identification accuracy.

Summary of the Embodiments

An object detection device according to a first aspect of the present disclosure includes: capture point acquiring circuitry which, in operation, acquires, as two or more capture points, two or more unit areas that have captured an object from a plurality of unit areas into which measurement range of one or more radar devices is divided for a distance and azimuth based on measurement information including at least one of an electric power profile and a Doppler speed profile generated by the one or more radar devices using reflected wave from the object; cluster generating circuitry which, in operation, generates a cluster including the two or more capture points; sub-cluster generating circuitry which, in operation, divides the cluster into one or more first sub-clusters each corresponding to a part of the object having a different traveling direction or traveling speed from a traveling direction or a traveling speed of a main part of the object and a second sub-cluster corresponding to the main part of the object; and speed calculating circuitry which, in operation, calculates a traveling speed of the object based on one or more capture points belonging to the second sub-cluster.

An object detection device according to a second aspect of the present disclosure is such that in the object detection device according to the first aspect, the speed calculating circuitry that calculates a traveling speed of the object based on the at least one of the electric power profile and the Doppler speed profile which corresponding to the one or more capture points belonging to the second sub-cluster.

An object detection device according to a third aspect of the present disclosure is such that in the object detection device according to the first aspect, the traveling speed of the object is a Doppler speed.

An object detection device according to a fourth aspect of the present disclosure is such that the object detection device according to the first aspect further includes: tracking circuitry which, in operation, performs a tracking process on the cluster based on the one or more capture points belonging to the second sub-cluster.

An object detection device according to a fifth aspect of the present disclosure is such that the object detection device according to the fourth aspect further includes: object determining circuitry which, in operation, identifies a type of the object based on the measurement information and a result of the tracking process.

An object detection device according to a sixth aspect is such that in the object detection device according to the fifth aspect, the object determining circuitry identifies a vehicle type based on at least one of the number, positions, sizes, and speed distributions of the one or more first sub-clusters.

An object detection device according to a seventh aspect is such that in the object detection device according to the fifth aspect, the object determining circuitry identifies the number of people based on at least one of the number, positions, sizes, and speed distributions of the one or more first sub-clusters.

An object detection device according to an eighth aspect is such that in the object detection device according to the first aspect, the sub-cluster determining circuitry that generates the one or more first sub-clusters and the second sub-cluster based on a restriction relation between an azimuth measurement value and a Doppler speed measurement value for the two or more capture points.

An object detection device according to a ninth aspect is such that in the object detection device according to the eighth aspect, the sub-cluster determining circuitry generates the one or more first sub-clusters and the second sub-cluster based on a distance from the curve represented by formula (1) mentioned above to each capture point.

An object detection device according to a tenth aspect is such that the object detection device according to the first aspect further includes: tracking circuitry which, in operation, performs a tracking process on both the one or more first sub-clusters and the second sub-cluster based on one or more capture points belonging to the one or more first cluster and the one or more capture points belonging to the second sub-cluster.

An object detection device according to an eleventh aspect of the present disclosure is such that the object detection device according to the first aspect further includes: a space position integrating circuitry which, in operation, sets the same coordinate system for a plurality of radar devices installed at mutually different positions, in which the capture point acquiring circuitry that acquires the two or more capture points that have captured the object for each of the plurality of radar devices based on each of the measurement information, which are mutually different, inputted from the plurality of radar devices, the cluster generating circuitry generates the cluster for each of the radar devices, the space position integrating circuitry integrates the clusters, and the sub-cluster generating circuitry divides the integrated clusters into the one or more first sub-clusters and the second sub-cluster.

An object detection method according to a twelfth aspect, includes: acquiring, as two or more capture points, two or more unit areas that have captured an object from a plurality of unit areas into which measurement range of one or more radar devices is divided for a distance and azimuth based on measurement information including at least one of an electric power profile and a Doppler speed profile generated by the one or more radar devices using reflected wave from the object; generating a cluster including the two or more capture points; dividing the cluster into one or more first sub-clusters each corresponding to a part of the object having a different traveling direction or traveling speed from a main part of the object and a second sub-cluster corresponding to the main part of the object; and calculating a traveling speed of the object based on one or more capture points belonging to the second sub-cluster.

Various embodiments are described above with reference to the drawings. It is needless to say, however, that the present disclosure is not limited to such examples. It is obvious that a person skilled in the art can conceive various variations or modifications in the category stated in the claims. It is understood that those variations or modifications also naturally belong to the technical scope of the present disclosure. Each component in the embodiments described above may be arbitrarily combined in a scope that does not deviate from the intent of the present disclosure.

While, in each of the embodiments described above, the present disclosure is described with examples of configuration using hardware, the present disclosure can also be implemented with software in coordination with hardware.

In addition, each functional block used in the description of each of the embodiments described above is implemented as an LSI that is an integrated circuit typically having an input terminal and an output terminal. They may be individually made a chip or may be a chip including a part or all. Here, while it is assumed to be an LSI, depending on a difference in degree of integration, it may be referred to as an IC, a system LSI, a super LSI, or a ultra LSI.

In addition, a method of making an integration circuit is not limited to an LSI, and it may be implemented by using a purpose-built circuit or a general-purpose processor. An FPGA (Field Programmable Gate Array) that can be programmed after manufacturing of an LSI or a reconfigurable processor capable of reconfiguration of connection or setting of circuit cells in an LSI may also be utilized.

Furthermore, with advancement of the semiconductor technology or any different technology derived therefrom, if a technique of making an integration circuit that replaces the LSI emerges, naturally, a functional block may be integrated using the technique. Application of the biotechnology or the like may be a possibility.

The present disclosure can be used in an object detection device that detects an object present around a radar device, using a measurement result of the radar device.

What is claimed is:

1. A system, comprising:
one or more radar devices configured to generate measurement information including at least one of an electric power profile and a Doppler speed profile generated by the one or more radar devices using a reflected wave from an object;
capture point acquiring circuitry configured to acquire the measurement information from the one or more radar devices, and extract, as two or more capture points, two or more unit areas that have captured the object from a plurality of unit areas into which measurement range of the one or more radar devices is divided for a distance and azimuth based on the measurement information;
cluster generating circuitry configured to generate a cluster including the two or more capture points;
sub-cluster generating circuitry configured to divide the cluster into one or more first sub-clusters, each corresponding to a part of the object having a different traveling direction or traveling speed from a traveling direction or a traveling speed of a main part of the object, and a second sub-cluster corresponding to the main part of the object; and
speed calculating circuitry configured to calculate a traveling speed of the object based on one or more capture points belonging to the second sub-cluster.

2. The system according to claim 1, wherein the speed calculating circuitry calculates the traveling speed of the object based on the at least one of the electric power profile and the Doppler speed profile which corresponds to the one or more capture points belonging to the second sub-cluster.

3. The system according to claim 1, wherein a speed of the two or more capture points is indicated by a Doppler speed.

4. The system according to claim 1, further comprising: tracking circuitry configured to perform a tracking process on the cluster based on the one or more capture points belonging to the second sub-cluster.

5. The system according to claim 4 further comprising: object determining circuitry configured to identify a type of the object based on the measurement information and a result of the tracking process.

6. The system according to claim 5, wherein the object determining circuitry identifies a vehicle type based on at least one of the number, positions, sizes, and speed distributions of the one or more first sub-clusters.

7. The system according to claim 5, wherein the object determining circuitry identifies a number of people based on at least one of the number, positions, sizes, and speed distributions of the one or more first sub-clusters.

8. The system according to claim 1, wherein the sub-cluster generating circuitry generates the one or more first sub-clusters and the second sub-cluster based on a restriction relation between an azimuth measurement value and a Doppler speed measurement value for the two or more capture points,
the restriction relation indicates a distance from a curve represented by the following formula (1) to each capture point:

$$v_r = v_{all} \cos(\lambda_{all} - \theta) \qquad (1)$$

where $v_r$: Doppler speed measurement value;
$\theta$: Azimuth measurement value;
$v_{all}$: Traveling speed corresponding to all capture points in a cluster; and
$\lambda_{all}$: Azimuth of a traveling direction corresponding to all capture points in the cluster.

9. The system according to claim 1, further comprising: tracking circuitry configured to perform a tracking process on both the one or more first sub-clusters and the second sub-cluster based on one or more capture points belonging to the one or more first cluster and the one or more capture points belonging to the second sub-cluster.

10. A system, comprising:
a plurality of radar devices configured to generate a plurality of measurement information, each of the plurality of measurement information including at least one of an electric power profile and a Doppler speed profile generated by the plurality of radar devices using a reflected wave from an object, the plurality of radar devices being positioned at a plurality of mutually different positions;
capture point acquiring circuitry configured to acquire the plurality of measurement information from the plurality of radar devices, and extract, as two or more capture points, two or more unit areas that have captured the object from a plurality of unit areas into which measurement range of the plurality of radar devices is divided for a distance and azimuth based on each of the plurality of measurement information;
cluster generating circuitry configured to generate a cluster including the two or more capture points for each of the plurality of radar devices;
space position integrating circuitry configured to integrate the cluster by setting the same coordinate system for the plurality of radar devices;
sub-cluster generating circuitry configured to divide the integrated cluster into one or more first sub-clusters, each corresponding to a part of the object having a different traveling direction or traveling speed from a traveling direction or a traveling speed of a main part of the object, and a second sub-cluster cluster corresponding to the main part of the object; and
speed calculating circuitry configured to calculate a traveling speed of the object based on one or more capture points belonging to the second sub-cluster.

11. An object detection method, comprising:
generating, by one or more radar devices, measurement information including at least one of an electric power profile and a Doppler speed profile generated by the one or more radar devices using a reflected wave from an object;
extracting, as two or more capture points, two or more unit areas that have captured the object from a plurality of unit areas into which measurement range of the one or more radar devices is divided for a distance and azimuth based on the measurement information;
generating a cluster including the two or more capture points:
dividing the cluster into one or more first sub-clusters, each corresponding to a part of the object having a different traveling direction or traveling speed from a main part of the object, and a second sub-cluster corresponding to the main part of the object; and
calculating a traveling speed of the object based on one or more capture points belonging to the second sub-cluster.

* * * * *